| United States Patent [19] | [11] 3,882,194 |
| Krebaum et al. | [45] May 6, 1975 |

[54] COGRAFTED COPOLYMERS OF A POLYOLEFIN, AN ACID OR ACID ANHYDRIDE AND AN ESTER MONOMER

[75] Inventors: Lawrence J. Krebaum, Palatine; William C. L. Wu, Arlington Heights; John Machonis, Jr., Schaumburg, all of Ill.

[73] Assignee: Chemplex Company, Rolling Meadows, Ill.

[22] Filed: Jan. 26, 1973

[21] Appl. No.: 327,065

[52] U.S. Cl. .......................... 260/878 R; 260/78.4 D
[51] Int. Cl. ............................................. C08f 15/00
[58] Field of Search ................... 260/878 R, 78.4 D

[56] References Cited
UNITED STATES PATENTS

| 3,312,757 | 4/1967 | McRitchie | 260/878 R |
| 3,317,634 | 5/1967 | Longworth | 260/878 R |
| 3,416,990 | 12/1968 | Robinson, Jr. | 260/878 R |
| 3,654,203 | 4/1972 | Daimer et al. | 260/78.4 D |
| 3,766,135 | 10/1973 | Yamanouchi et al. | 260/878 R |
| 3,776,866 | 12/1973 | Nakayama et al. | 260/78.4 D |

*Primary Examiner*—Joseph L. Schofer
*Assistant Examiner*—A. Holler
*Attorney, Agent, or Firm*—Hofgren, Wegner, Allen, Stellman & McCord

[57] ABSTRACT

Cografted copolymers of polyolefins, at least one polymerizable acyclic, cyclic or polycyclic ethylenically unsaturated acid or acid anhydride monomer and at least one polymerizable conjugated ethylenically unsaturated ester monomer. These cografted copolymers exhibit superior performance in composites, blends and chemically reacted derivative products when compared with unmodified polyolefins and polyolefins grafted with only one of these monomers.

15 Claims, No Drawings

3,882,194

COGRAFTED COPOLYMERS OF A POLYOLEFIN, AN ACID OR ACID ANHYDRIDE AND AN ESTER MONOMER

BACKGROUND OF THE INVENTION

It is generally known that polyolefins are not compatible with most common fillers or other polymers and are not amenable to modification by such chemical reagents which readily modify other polymers. Fillers have been treated to alter their surface properties and very reactive reagents have been devised which are compatible with and do react with polyolefins but such modified fillers and reagents are expensive and the improvements obtained thereby have been limited. Alternately, polyolefins have been modified by grafting actively polymerizable olefinically unsaturated acids, esters and anhydrides and again results have been unsatisfactory in one or more of the following ways:

Sometimes dilute solution graft techniques were required which were tedious, expensive or wasteful of monomers and solvents.

Melt graft techniques with active monomers gave products containing ungrafted homopolymers and which were heterogeneous thus having poor tensile properties with or without fillers.

Many melt graft products had such low melt indexes as to be unprocessable.

Many graft products appeared to consist of long chains of grafted polar monomers and non-polar polyolefin backbones. Such products separated into polar or non-polar domains which resulted in inferior or only marginally improved properties of the neat or filled products.

Graft products of such esters as dibutylmaleate and diethylfumarate as described in U.S. Pat. No. 3,267,173 and British Pat. No. 1,168,959, although overcoming some or all of the above four shortcomings, were not chemically reactive.

Graft products of such acids and anhydrides as described in our copending application Ser. No. 316,230, filed Dec. 18, 1972, overcome the above shortcomings. However, the cografted copolymers of this invention have improved flexibility, impact strength, color, melt index and filler loading capacity over the copolymers of this copending application.

DESCRIPTION OF THE PRIOR ART

The most pertinent prior art of which applicants are aware are U.S. Pat. Nos. 3,267,173 and 3,646,165, Belgian Pat. No. 616,225 and British Pat. Nos. 946,384 and 1,168,959.

SUMMARY OF THE INVENTION

We have found that by cografting acids and anhydrides which are acyclic or cyclic and preferably bridged and/or polycyclic and wherein the olefinic unsaturation is so situated and substituted as to allow only a slow rate of polymerization simultaneously with such conjugated unsaturated esters which have moderate rates of polymerization to polyolefins, the products have reactive functionality for post-reaction, contain little or no homopolymer of either monomer class, appear to contain only short grafted monomer chains which do not separate into polar and non-polar domains whether neat or compounded, have high melt indexes and, therefore, are easily processed, have superior tensile and impact properties whether neat or compounded and have improved color and filler loading capacity over the other aforementioned graft copolymers.

DESCRIPTION OF THE PREFERRED EMBODIMENTS

The copolymers of this invention are cografted copolymers of polyolefins modified by one or more acrylic, cyclic or polycyclic unsaturated acids and acid anhydrides and one or more conjugated unsaturated esters. These new cografted copolymers exhibit greatly improved compatability with other materials and are chemically reactive.

By polyolefins we mean polymers and copolymers of ethylene, propylene, butene and other unsaturated aliphatic hydrocarbons. Especially preferable in this invention are ethylene homopolymers prepared by either the low pressure or high pressure methods (linear or high density polyethylene and branched or low density polyethylene, respectively) and such copolymers of ethylene with up to 40 weight percent of such higher olefins as propylene, 1-butene and 1-hexene and which may contain up to 5 percent of such di- or triolefins which are used commercially in ethylene-propylene terpolymers such as ethylidenenorbornene, methylenenorbornene, 1,4-hexadiene and vinylnorbornene. Also, it is preferable sometimes to graft to blends of two or more of the above homopolymers, copolymers and terpolymers. Whereas, the above polymers represent the preferred embodiments of our invention they should not be regarded as limiting the invention in any way.

By acyclic, cyclic and polycyclic unsaturated acids and anhydrides, we mean compounds which contain either none or one or more carboxylic and/or heterocyclic moieties not including the anhydride ring. The rings of the cyclic and polycyclic acids and anhydrides may be simple, fused, bridged, spiro, joined directly, joined through aliphatic chains containing one or more carbon, oxygen, nitrogen or sulfur atoms, or combinations of the above ring arrangements. These classes are represented respectively by the following structures which are meant to be illustrative rather than limiting:

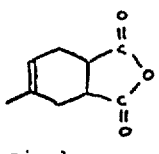

simple 4-methylcyclohex-4-ene-1,2-dicarboxylic acid anhydride
(4-MTHPA)

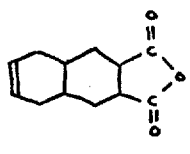

fused 1,2,3,4,5,8,9,10-octahydro-naphthalene-2,3-dicarboxylic acid anhydride

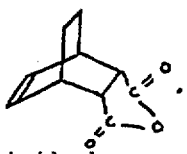

bridged bicyclo[2.2.2]oct-5-ene-2,3-dicarboxylic acid anhydride
(BODA)

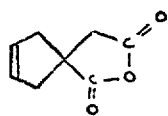

spiro

2-Oxa-1,3-diketospiro[4,4]non-7-ene

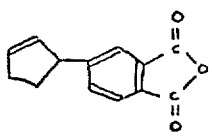

joined directly and aromatic 4-(2-cyclopentenyl)-benzene 1,2-dicarboxylic acid anhydride

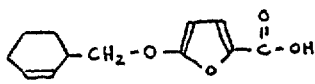

joined through an aliphatic chain and heterocyclic 5-(2-cyclohexenylmethyloxy)-2-furoic acid

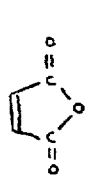

acyclic
maleic anhydride

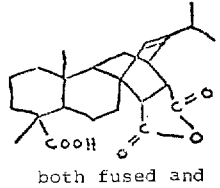

both fused and bridged rings maleo-pimaric acid (M-PA)

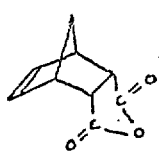

bridged bicyclo[2.2.1]hept-5-ene-2,3-dicarboxylic acid anhydride (NBDA)

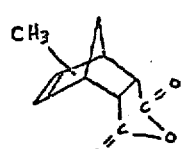

bridged, mixture of isomers x-methylbicyclo[2.2.1]hept-5-ene-2,3-dicarboxylic acid anhydride (XMNA)

Rings may contain 3, 4, 5, 6, 7 or 8 atoms but generally 5 and 6 member rings are preferred. The monomer also may contain aromatic rings. The olefinic bond is preferably unconjugated with the acid or anhydride groups. Such conjugated monomers as acrylic acid, methacrylic acid, itaconic anhydride and fumaric acid tend to polymerize too fast for the successful practice of this invention. If, however, the olefinic bond is conjugated but otherwise deactivated as by strain or alkyl substitution, the monomer can be used in this invention. Nonlimiting examples of such conjugated but deactivated monomers are maleic anhydride and cyclohex-1-ene-1,2-dicarboxylic anhydride.

Included among the conjugated unsaturated esters suitable for this invention are dialkyl maleates, dialkyl fumarates, dialkyl itaconates, dialkyl mesaconates, dialkyl citraconates, alkyl acrylates, alkyl crotonates, alkyl tiglates and alkyl methacrylates where alkyl represents aliphatic, aryl-aliphatic and cycloaliphatic groups containinig 1-12 carbon atoms.

In the practice of this invention, it is often desirable to use more than one monomer in either or both classes of monomers in order to control the physical properties of the final products. The method in general consists of heating a mixture of the polymers and the monomers in a solvent or above the melting point of the polyolefin with or without a catalyst. Thus, the cografting occurs in the presence of air, hydroperoxides, other free radical catalysts or in the essential absence of those materials where the mixture is maintained at elevated temperatures and (if no solvent is used) preferably under high shear.

In making the cograft copolymers of this invention, the mixture of polyolefin or polyolefins and monomers is heated in a solvent or above the melting point of the polyolefin at reaction temperatures and under reacting conditions described below and thereafter the resulting cografted copolymer is recovered. The term "recovered" means any method or system which separates or utilizes the cograft copolymer that is produced. Thus, the term includes recovery of the copolymer in the form of precipitated fluff, pellets, powders and the like as well as further chemically reacted or blended pellets, powders and the like and in the form of shaped articles formed directly from the resulting copolymer.

The reaction may be brought about merely by heating the mixture or by heating in the presence of air, free radical catalysts such as hydroperoxides or by heating in the absence of a catalyst and/or under high shear conditions. Any of the commonly known hydroperoxides which have a half life of at least 1 minute at 145°C. may be used in the method of this invention. Such hydroperoxides have the general formula R—O—OH wherein R is an organic radical. Among the suitable hydroperoxides are t-butyl hydroperoxide, p-menthane hydroperoxide, pinane hydroperoxide, and cumene hydroperoxide, as well as others known in the art. The elevated temperature causes rapid decomposition of the hydroperoxide which catalyzes the reaction between polyolefins and monomers to form the cograft copolymer.

Obviously, the more homogeneous the mixture prior to heating, the less mixing will be required of the solution or molten composition. Generally, in order to obtain a desirable conversion, it has been found that some form of mixing is highly desirable in the absence of a solvent even when a uniform mixture of all the components of the composition is formed prior to heating. In general, when a solvent is not used, the composition should be heated to a temperature above about 130°C. and it is preferred to use the temperatures ranging from about 200° to about 360°C. Temperatures substantially above about 360°C. are generally to be avoided in order to avoid substantial decomposition of the polymeric ingredients. However, if the decomposition products are not undesirable in the product, as in the production of high melt index waxes, higher temperatures may be employed. The reaction time required is quite short, being of the magnitude of from a few seconds to about twenty minutes, although extended heating times do not substantially affect the product and may be employed when desired.

A convenient method of accomplishing the reaction is to premix the ingredients and then extrude the composition through a heated extruder. Other mixing means, such as a Brabender mixer, roll mills and the like may also be employed for the process. In order to prevent undue increase in molecular weight with a possibility of some crosslinking at elevated temperatures, it is desirable to carry out the reaction in a closed reaction vessel. A conventional single or multiple screw extruder accomplishes this result without the use of auxiliary equipment and for this reason is a particularly desirable reaction vessel, although it is by no means necessary.

The resulting copolymers of this invention are found to consist of about 50–99.9 weight percent of polyolefin, about 0.05–25 weight percent of the cyclic unsaturated acid or acid anhydride or mixtures thereof and about 0.05–25 weight percent of the unsaturated ester and mixtures thereof and these resulting graft copolymers are capable of being blended or reacted with a wide variety of other materials to modify the copolymer further.

Among the esters in the cografted copolymer of this invention are dibutyl maleate, diethyl fumarate and dimethyl itaconate. Among the acids and acid anhydrides of these copolymers are maleic anhydride, tetrahydrophthalic anhydride, x-methylbicyclo[2,2,1]hept-5-ene-2,3-dicarboxylic acid anhydride and bicyclo[2,2,1-]hept-5-ene-2,3-dicarboxylic acid anhydride.

The following examples illustrate the method of cografting according to this invention and the resulting copolymers of the invention.

EXAMPLE 1

A mixture of 15 pounds of tetrahydrophthalic anhydride (THPA) and 150 pounds of high density polyethylene (7 HLMI) is prepared by spraying an acetone solution of THPA onto the high density polyethylene powder followed by evaporation of the solvent. This mixture is fed to a corotating twin-screw extruder equipped with five heating zones. The feed rate is about 50 pounds per hour (pph) and the screw speed is 250 rpm. The temperature profile is Zone 1 = 200°C., Zone 2 = 270°C., Zone 3 = 320°C., Zone 4 = 270°C., Zone 5 = 230°C. and die temperature = 180°C. To Zone 2 is added a mixture of dibutylmaleate (DBM) and catalyst (t-butylhydroperoxide, TBHP) at a rate of about 0.3 pph. To Zone 3 is added a mixture of DBM and TBHP at a rate of about 2.4 pph DBM and 0.3 pph TBHP. The reaction mixture is devolatilized at Zone 4. The properties of the resulting polyethylene/THPA/DBM graft copolymer are shown below:

| | |
|---|---|
| Percent THPA incorporation | 0.5 (est.) |
| Percent DBM incorporation | 1.5 (est.) |
| Melt index | 0.29 |
| Tensile yield, psi | 3610 |
| Tensile break, psi | 3140 |
| Elongation, % | 950 |

A blend of the above cograft copolymer with 40 wt. percent TiO₂ is prepared. For comparison, a blend of high density polyethylene with about the same melt index as the graft copolymer is blended with 40 wt. percent TiO₂. For further comparison, a blend of 40 wt. percent TiO₂ with a graft copolymer prepared under the same conditions but using only THPA and omitting the dibutylmaleate was prepared (see Example 11 of copending application Ser. No. 316,230. The properties of plaques of the three blends are shown below:

| | HDPE Control | THPA(only) Graft Copolymer | THPA/DBM Cograft Copolymer |
|---|---|---|---|
| MI | 0.12 | 0.24 | 0.29 |
| Filler | TiO₂ | TiO₂ | TiO₂ |
| Wt. % Filler | 40 | 40 | 40 |
| Tensile yield, psi | 4260 | 4680 | 3840 |
| Tensile break, psi | 4260 | 2650 | 2240 |
| Elongation, % | <10 | 150 | 420 |

It is evident from the table above that although THPA graft copolymer is better than the HDPE control, the THPA-DBM cograft copolymer is markedly superior to both.

EXAMPLE 2

A mixture of 15 pounds maleic anhydride (MA) and 150 pounds high density polyethylene (7 HLMI) is prepared by spraying an acetone solution of MA onto the high density polyethylene powder followed by evaporation of the solvent. This mixture is fed to a corotating twin-screw extruder equipped with heating zones. The feed rate is about 50 pph and the screw speed is 300 rpm. The temperature profile is Zone 1 = 200°C., Zone 2 = 270°C., Zone 3 = 320°C., Zone 4 = 270°C., Zone 5 = 230°C. and die temperature = 180°C. To Zone 2 is added about 5.0 pph DBM and 0.5 pph TBHP. The reaction mixture is devolatilized at Zone 4.

The properties of the resulting polyethylene/-MA/DBM cograft copolymer are shown below:

| | |
|---|---|
| HLMI | 2.8 |
| Tensile yield, psi | 3380 |
| Tensile break, psi | 2240 |
| Elongation, % | 40 |

A blend of the above cograft copolymer with 40 wt. percent of TiO₂ is prepared. For comparison, a blend of 40 wt. percent TiO₂ with a graft copolymer prepared under similar conditions but using only MA and omitting the DBM was prepared (see Example 14 of copending application Ser. No. 316,230). The properties of plaques of the two blends are compared below.

| | MA/DBM Cograft Copolymers | MA (only) Graft Copolymers |
|---|---|---|
| Filler | TiO$_2$ | TiO$_2$ |
| Wt. % filler | 40 | 40 |
| Tensile yield, psi | 3610 | 4210 |
| Tensile break, psi | 2670 | 4210 |
| Elongation, % | 110 | <12 |

As shown by the table the cograft copolymer does not become brittle when filled with 40 wt. percent TiO$_2$ as does the MA graft copolymer.

EXAMPLES 3 THRU 5

A high density ethylene-hexene-1 copolymer (8 HLMI, 0.943 density) is fed to a corotating twin-screw extruder equipped with five heating zones. The feed rate is about 50 pph and the screw speed is 250 rpm. The temperature profile is Zone 1 = 200°C., Zone 2 = 270°C., Zone 3 = 320°C., Zone 4 = 270°C., Zone 5 = 230°C. and die temperature = 180°C. The monomer(s) with dissolved catalyst are added to Zones 2 and 3 at equal rates. The mixture is devolatilized at Zone 4.

Monomer feed concentrations and properties of the graft copolymers are given below:

| Example No. | Feed XMNA Wt.% | Feed DBM Wt.% | TBHP wt.% | Graft Copolymers M. I. | % XMNA | % DBM |
|---|---|---|---|---|---|---|
| 3 | 3.8 | none | none | 0.66 | 1.2 | none |
| 4 | 3.0 | 4.9 | 0.25 | 0.83 | 1.5 | 0.2 |
| 5 | 3.0 | 15.2 | 0.75 | 0.64 | 1.4 | 1.1 |

Blends of the above graft copolymers with 20 wt. percent Dechlorane Plus 25 (Hooker Division of Occidental Petroleum Corp.'s Trademark for a proprietary cyclic chlorinated hydrocarbon containing 65 percent chlorine and having a particle size range of 2–5 microns) and 15 wt. percent antimony oxide were prepared and their properties are compared below:

| Example | Monomers | Tensile Properties of Dechlorane Plus/Sb$_2$O$_3$ Blends Yield, psi | Break, psi | Elong. % |
|---|---|---|---|---|
| 3 | 1.2% XMNA only | 2790 | 2270 | 56 |
| 4 | 1.5% XMNA + 0.2% DBM | 2620 | 1740 | 330 |
| 5 | 1.4% XMNA + 1.1% DBM | 2280 | 1720 | 590 |

Thus, a cograft of dibutylmaleate and XMNA shows improved tensile properties of highly loaded graft copolymers as compared with highly loaded simple graft copolymers of XMNA. These examples show also that ethylene copolymers can be used in the practice of this invention.

EXAMPLE 6

An electrically heated C. W. Brabender, Inc. mixing head was modified so that it could hold pressure. To this reactor was charged a mixture of 5.0 parts of NBDA, 5.0 parts of DEF, 0.1 part of TBHP and 89.9 parts of high density polyethylene (7 HLMI). The reactor was closed, purged with nitrogen and vacuumed until essentially free of oxygen and heated to 300°C. Agitation at 275 rpm was started when the temperature reached 160°C. After 15 minutes at 300°C. and 275 rpm, the mixture was removed from the reactor, quench cooled in hexane, dissolved in trichlorobenzene at 130°C., precipitated in cold methyl ethyl ketone and dried at 95°C. and 0.2 mm. mercury absolute pressure overnight. The precipitated product contained 2.3 percent by weight of NBDA mers and 1.7 percent by weight of DEF mers. The HLMI of the gross product was 10.8. Thus, cografting is readily achieved with NBDA and DEF as well as with XMNA and DBM.

EXAMPLE 7

In the same equipment and under the same conditions as in Example 6, 5.0 wt. percent of NBDA and 5.0 wt. percent of DMI were cografted to high density polyethylene (7 HLMI). The product, after recovery in the same manner, contained 1.5 percent NBDA mers and 0.8 percent DMI mers and had an HLMI of 13.5. Thus DMI is a suitable ester for cografting.

EXAMPLE 8

In the same equipment and under the same conditions as in Example 6, 5.0 wt. percent of NBDA and 5.0 wt. percent of DBM were cografted to low density polyethylene (1.5 MI). The product, after recovery in the same manner, contained 1.0 wt. percent NBDA mers and 0.4 percent DBM mers and had an MI of 0.9. Thus a low density polyethylene can be cografted by this method.

EXAMPLE 9

In the same equipment and under the same conditions as in Example 6, 5.0 wt. percent of NBDA and 5.0 wt. percent of DBM were cografted to an EPDM terpolymer (DuPont trademark Nordel 1500, 5.6 HLMI). The product, after recovery in the same manner, contained 1.6 percent NBDA mers and 0.6 percent DBM mers and had an HLMI of 12.7. Thus an EPDM terpolymer rubber can be cografted by this method.

EXAMPLE 10

In the same equipment and under the same conditions as in Example 6, 5.0 wt. percent NBDA and 5.0 wt. percent DBM were cografted to polypropylene (MI = 1.6, 97 percent isotactic). The product, after recovery in the same manner, contained 0.3 percent NBDA mers and had an MI of 21.8. Thus polypropylene can be cografted by this method.

EXAMPLE 11

In the same equipment and under the same conditions as in Example 6, 5.0 wt. percent NBDA and 5.0 wt. percent DBF were cografted to a mixture of 80 wt. percent high density polyethylene (12.6 HLMI) and 20 wt. percent EPDM terpolymer (DuPont trademark Nordel 1500, 5.6 HLMI). The product, after recovery in the same manner, contained 2.6 percent NBDA mers and 1.4 percent DBF mers and had an HLMI of 8.8. Thus mixtures of polyolefins can be cografted by this method.

All parts and percentages herein are by weight.

The following is a list of the chemical abbreviations used herein:

| | |
|---|---|
| DBF | — dibutyl fumarate |
| DBM | — dibutyl maleate |
| DEF | — diethyl fumarate |
| DMI | — dimethyl itaconate |
| EPDM | — ethylene-propylene-diene terpolymer |
| HDPE | — high density polyethylene |
| MA | — maleic anhydride |
| NBDA | — bicyclo[2.2.1]hept-5-ene-2,3-dicarboxylic acid anhydride |
| TBHP | — t-butylhydroperoxide |
| THPA | — tetrahydrophthalic anhydride |
| XMNA | — x-methyl bicyclo[2.2.1]hept-5-ene-2,3-dicarboxylic acid anhydride |

Having described our invention as related to the embodiments set out herein, it is our intention that the invention be not limited by any of the details of description, unless otherwise specified, but rather be construed broadly within its spirit and scope as set out in the appended claims.

We claim:

1. A cograft copolymer of about 50-99.9 weight percent of a polyolefin member of the group consisting of unconjugated and deactivated conjugated polyolefins, about 0.05-25 weight percent of at least one ethylenically unsaturated ester and about 0.05-25 weight percent of at least one member of the group consisting of polymerizable acyclic, cyclic and polycyclic ethylenically unsaturated acids and acid anhydrides.

2. A cograft copolymer of about 50-99.9 weight percent of a polyolefin member of the group consisting of unconjugated and deactivated conjugated polyolefins, about 0.05-25 weight percent of at least one ethylenically unsaturated ester and about 0.05-25 weight percent of at least one member of the group consisting of polymerizable acyclic, cyclic and polycyclic ethylenically unsaturated acids and acid anhydrides wherein said ethylenically unsaturated anhydride comprises maleic anhydride.

3. A cograft copolymer of about 50-99.9 weight percent of polyolefin, about 0.05-25 weight percent of at least one ethylenically unsaturated ester and about 0.05-25 weight percent of at least one member of the group consisting of polymerizable acyclic, cyclic and polycyclic ethylenically unsaturated acids and acid anhydrides wherein said ethylenically unsaturated anhydride comprises tetrahydrophthalic anhydride.

4. A cograft copolymer of about 50-99.9 weight percent of polyolefin, about 0.05-25 weight percent of at least one ethylenically unsaturated ester and about 0.05-25 weight percent of at least one member of the group consisting of polymerizable acyclic, cyclic and polycyclic ethylenically unsaturated acids and acid anhydrides wherein said ethylenically unsaturated anhydride comprises x-methylbicyclo[2.2.1]hept-5-ene-2,3-dicarboxylic acid anhydride.

5. A cograft copolymer of about 50-99.9 weight percent of polyolefin, about 0.05-25 weight percent of at least one ethylenically unsaturated ester and about 0.05-25 weight percent of at least one member of the group consisting of polymerizable acyclic, cyclic and polycyclic ethylenically unsaturated acids and acid anhydrides wherein said ethylenically unsaturated anhydride comprises bicyclo[2.2.1]hept-5-ene-2,3-dicarboxylic acid anhydride.

6. A cograft copolymer of about 50-99.9 weight percent of a polyolefin comprising polypropylene homopolymer, about 0.05-25 weight percent of at least one ethylenically unsaturated ester and about 0.05-25 weight percent of at least one member of the group consisting of polymerizable acyclic, cyclic and polycyclic ethylenically unsaturated acids and acid anhydrides.

7. A cograft copolymer of about 50-99.9 weight percent of a polyolefin comprising an essentially linear polyethylene homopolymer having a density of at least about 0.94, about 0.05-25 weight percent of at least one ethylenically unsaturated ester and about 0.05-25 weight percent of at least one member of the group consisting of polymerizable acyclic, cyclic and polycyclic ethylenically unsaturated acids and acid anhydrides.

8. A cograft copolymer of about 50-99.9 weight percent of a polyolefin comprising a branched polyethylene homopolymer having a density of from about 0.90-0.94, about 0.05-25 weight percent of at least one ethylenically unsaturated ester and about 0.05-25 weight percent of at least one member of the group consisting of polymerizable acyclic, cyclic and polycyclic ethylenically unsaturated acids and acid anhydrides.

9. A cograft copolymer of about 50-99.9 weight percent of a polyolefin comprising an essentially linear copolymer of at least 60 percent ethylene and up to 40 percent of an alpha olefin containing 4 to 6 carbon atoms, about 0.05-25 weight percent of at least one ethylenically unsaturated ester and about 0.05-25 weight percent of at least one member of the group consisting of polymerizable acyclic, cyclic and polycyclic ethylenically unsaturated acids and acid anhydrides.

10. A cograft copolymer of about 50-99.9 weight percent of a polyolefin comprising a terpolymer of ethylene, propylene and up to 5 percent of a member of the group consisting of cyclic and acyclic dienes, about 0.05-25 weight percent of at least one ethylenically unsaturated ester and about 0.05-25 weight percent of at least one member of the group consisting of polymerizable acyclic, cyclic and polycyclic ethylenically unsaturated acids and acid anhydrides.

11. A cograft copolymer of about 50-99.9 weight percent of a polyolefin comprising a blend of a plurality of members of the group consisting of an essentially linear polyethylene homopolymer having a density of at least about 0.90, a polypropylene homopolymer, an essentially linear copolymer of at least 60 percent ethylene and up to 40 percent of an alpha olefin containing 4 to 6 carbon atoms and a terpolymer of ethylene, propylene and up to 5 percent of a member of the group consisting of cyclic and acyclic dienes, about 0.05-25 weight percent of at least one ethylenically unsaturated ester and about 0.05-25 weight percent of at least one member of the group consisting of polymerizable acyclic, cyclic and polycyclic ethylenically unsaturated acids and acid anhydrides.

12. A cograft copolymer of about 50-99.9 weight percent of a polyolefin, about 0.05-25 weight percent of at least one ethylenically unsaturated ester comprising dibutyl maleate and about 0.05-25 weight percent of at least one member of the group consisting of polymerizable acyclic, cyclic and polycyclic ethylenically unsaturated acids and acid anhydrides.

13. A cograft copolymer of about 50-99.9 weight percent of a polyolefin, about 0.05-25 weight percent of at least one ethylenically unsaturated ester comprising diethyl fumarate and about 0.05-25 weight percent of at least one member of the group consisting of polymerizable acyclic, cyclic and polycyclic ethylenically unsaturated acids and acid anhydrides.

14. A cograft copolymer of about 50–99.9 weight percent of a polyolefin, about 0.05–25 weight percent of at least one ethylenically unsaturated ester comprising dimethyl itaconate and about 0.05–25 weight percent of at least one member of the group consisting of polymerizable acyclic, cyclic and polycyclic ethylenically unsaturated acids and acid anhydrides.

15. A cograft copolymer of about 50–99.9 weight percent of a polyolefin, about 0.05–25 weight percent of at least one ethylenically unsaturated ester comprising dibutyl fumarate and about 0.05–25 weight percent of at least one member of the group consisting of polymerizable acyclic, cyclic and polycyclic ethylenically unsaturated acids and acid anhydrides.

* * * * *